United States Patent [19]

Bjellqvist et al.

[11] 4,278,518

[45] Jul. 14, 1981

[54] METHOD FOR REDUCING THE MONOMER RESIDUE CONTENT IN POLYMER PLASTICS

[75] Inventors: Bengt Bjellqvist, Stockholm; Torbjörn Reitberger, Skarholmen, both of Sweden; Kennard H. Morganstern, Roslyn, N.Y.

[73] Assignee: Radiation Dynamics, Inc., Long Island, N.Y.

[21] Appl. No.: 906,551

[22] Filed: May 16, 1978

[51] Int. Cl.$^3$ .............................................. C08J 3/28

[52] U.S. Cl. ................................ 204/159.2; 525/330

[58] Field of Search ..................................... 204/159.2

[56] References Cited

U.S. PATENT DOCUMENTS 4,086,411 4/1978 Nagano et al. ...................... 528/501

FOREIGN PATENT DOCUMENTS 53-16722 2/1978 Japan .

OTHER PUBLICATIONS

Chapiro, Radiation Chemistry of Polymeric Systems, Wiley & Sons; New York, 1962, pp. 464–473.

*Primary Examiner*—Wilbert J. Briggs, Sr.
*Attorney, Agent, or Firm*—Howard L. Rose

[57] ABSTRACT

The monomer content in chlorinated hydrocarbon plastic materials, as for example articles made from polymers of chloroprene vinyl chloride and vinylidene chloride, is substantially reduced by applying ionizing radiation in low dosage levels, e.g. 0.05–2 megarad to the material, either to the fully formed article, or the pellets from which the articles are molded or to the ground resin powder from which the pellets are formed.

10 Claims, No Drawings

METHOD FOR REDUCING THE MONOMER RESIDUE CONTENT IN POLYMER PLASTICS

THE INVENTION

This invention relates to the reduction of monomer content in articles formed from polymers of chlorinated hydrocarbons including notably polyvinylchloride, polyvinylidenechloride, chloroprene, and copolymers of a chlorinated monomer with other monomers such as styrene.

BACKGROUND TO THE INVENTION

It is known that certain halogen substituted hydrocarbon monomers notably vinyl chloride have toxic properties. Naturally such monomers are handled with care. However, after polymerization of the monomer, the solid relatively inert plastic materials into which the monomer has been converted are considered safe, and concern over toxicity is virtually at an end. However, safety is relative. Possible presence of significant monomer residue in the plastic material may create a hazard due to long term exposure to the plastic material by workers therewith, even perhaps to consumers in the event the plastic material is a food stuff packaging material.

In this respect vinyl chloride may be particularly dangerous, since contact therewith might be one cause of liver cancer. Moreover, when a vinyl chloride monomer residue is present in the polymer e.g. in copolymer pellets or articles, detectable quantities of vinyl chloride and/or perhaps lower polymers of the vinyl chloride can be leached out of the pellet or article.

The concern which exists is, therefore, whether the content of residual halohydrocarbon monomer, principally of vinyl chloride, in polymer articles is high enough so that monomer and/or lower polymer components will migrate from a packaging material into food product contents therein.

Certainly, manufacturers of the polymer and of foodstuff packaging material made therefrom employ polymerization techniques that are adapted to minimize the monomer content in the polymer materials. However, despite their best efforts to provide monomerfree polymer pellets and best efforts to avoid degradation of the polymer during the package forming operations, a measurable residual monomer content almost always can be found in packaging materials made from polymers of halogenated hydrocarbon monomers and in the PVC pellets. Examples of such monomers are vinyl chloride, vinylidene chloride and chloroprene.

BRIEF DESCRIPTION OF THE INVENTION

Briefly stated the process of this invention comprises treating homo polymers of halogenated hydrocarbon monomers and copolymers thereof with other monomers, such as for example styrene with ionizing radiation within the dosage range of 0.05–2.0 megarads whereby the extractable monomer content is reduced.

In particular this invention is directed to polymers of chlorinated hydrocarbon monomers and more particularly to homo polymers and copolymers made in whole or in part from vinyl chloride, vinylidene chloride and chloroprene.

The method of this invention involves exposing the polymeric material to ionizing radiation, which radiation embraces X-rays, gamma- and electron- radiation. In the application of the method of this invention these kinds of radiation are all essentially equivalent. Under exposure to irradiation, free radicals or other reactive species are generated in the material, which consume the residual monomer. It is surprising that even at very low proportions of monomer contention the polymer (10–0.02 ppm) irradiation can substantially reduce extractable monomer. Radiation doses <100 krads (1 joule/g) generally are fully sufficient to reduce the residue content of halohydrocarbon monomers to below the present detection limit, i.e. <0.02 ppm. The G-value for the monomer consumption is substantially independent of the dose-rate at low concentrations of monomers.

The irradiation is most easily carried out at ambient temperature. There is no obstacle, however, to use of elevated temperatures, provided that the temperature is maintained below the temperature at which the material deteriorates. The surrounding medium, being a gas (or a liquid), has only a minor influence on the G-value.

RATIONALE OF THE INVENTION

Ionizing radiation, e.g. from an electron beam generator is known to create many complex and sometimes competing reactions. For example, irradiation is known to induce polymerization of acrylonitrile. When applied to polymers, irradiation is known to cause cross linking, chain scission generation of gases, etc. In some instances physical properties of the polymer are improved for example: polyethylene when subjected to 20–30 megarads; polyvinyl chloride incorporating a pro-rad when subjected to 2–5 megarads; and polyvinylidene fluoride when subjected to more than about 8 megarads. In other polymers, however, undesired consequences (such as chain scission) equal, or even predominate over desired reactions (such as crosslinking) and degradation occurs, as for example; in butyl rubbers; in Teflon; and in cellulosics. Still other polymers, including polyacrylonitrile and polystyrene are largely unaffected by irradiation, particularly in the relatively low dosage area of 2–10 megarads. For this reason polystyrene has been employed in structural members of electron beam generators.

In summary polymers fall generally into three categories: those that are degraded by irradiation, for instance, butyl rubber; those that are unaffected by irradiation except at quite high dose levels where certain color and perhaps other deleterious changes occur, such as polystyrene and polyacrylonitrile; and those polymers whose physical properties are improved by irradiation such as polyethylene. In this latter category improvements are typically found with irradiation doses in the range of 10–30 megarads and if a pro-rad is included, in the range of 2–10 megarads. In both of these cases the effect of irradiation decreases with dosage and the effects virtually disappear at about the lower end of the dose range. Superficially then, it would seem that irradiation at dosage levels below what are considered to be low dosage, i.e. 2–10 megarads, would offer little hope in the absence of a pro-rad for improving polymer properties in any respect, and, indeed trials known to the inventors hereof, produced little or no physical improvement in tensile strength of polystyrene or of polyacrylonitrile.

It has now been found however, that the near zero irradiation range of 0.05–0.5 megarads is anamolous. Surprisingly large reductions of residual vinyl chloride monomer in vinyl chloride polymers (homo polymers and copolymers alike) are obtained from irradiation at 0.2 megarads. Physical properties of the polymers (including color) are almost totally unchanged by less than 0.5 megarads.

Although no across the board investigation has been made, it now appears that this near zero range of irradiation is anomolous for a substantial number of polymers. Such polymers respond differently in the 0.05–0.5 megarad range than they do in the 2–10 megarad range. Certainly the response of vinyl chloride polymers is different at the 0.05–0.5 range. Specifically the residual monomer vinyl chloride in polymer materials is reduced substantially. Significant chain scission does not appear to occur. Cross-linking, as measured by changes in rheologic properties does not appear to be significant.

It is believed that the monomer clean-up and essential absence of cross-linking are explainable in terms of the G-value for the reactions involved. The G-value for monomer attachment, in the instance of vinyl chloride is several orders of magnitude higher than the G-value for chain scission of the polymer. In essence then the 0.05–0.5 megarad dosage of high energy radiation preferred for practice of this invention constitutes insufficient radiation to cause a material level of chain scission in the polymer.

In terms of the present invention significant reduction of trace monomer content as almost the only consequence of very low level irradiation is precisely the desired result.

DETAILED PRACTICE OF THE INVENTION

The method can primarily be applied to those plastic materials, which wholly or partly are polymerization products of vinyl chloride, vinylidene chloride, chloroprene or some other unsaturated halogen substituted hydrocarbons. The method can also be used to advantage with co-polymers of these monomers and other monomers e.g.: vinylacetate and other vinylesters and vinylethers; ethene, propene, butadiene, isoprene, styrene and other unsaturated hydrocarbons; esters and other derivatives of acrylic- and methacrylic acids such as acrylic acid, methacrylic acid, methylmethacrylate, butylacrylate, and octylacrylate; esters and anhydrides of other unsaturated acids such as diethylfumarate, diethylitaconate and maleic acid anhydride; and N-vinylcarbazole, N-vinylpyrrolidone and other hetero compounds, etc.

The irradiation procedure may be carried out on the plastic material in any of the usual physical forms in which it is available. Thus, the material may be powder, granules, a dispersion, a foil or sheet; or an extruded, rolled, pressed or formed product.

As a general proposition, the 0.05–0.5 megarad range of the dosages herein contemplated as preferred are too low to cause significant degradation, even of sensitive polymers, yet is enough to hit, so to speak, the trace quantities of monomer in the polymer, causing (it is theorized) linkage of the previously free monomer molecules to the macromolecules of the polymer. The trace quantities of monomer are sensitive to the radiation likely because of the G-value factor alluded to previously. Tests indicate that 50% to 90% of the monomer content previously extractable from the polymer, is no longer present (at least in an extractable form).

The preferred range for practice of this invention is irradiation within the dosage range of 0.1–0.5 megarad. When the radiation dose exceeds 0.5 megarads, and notably is in the 0.5–2.0 megarads range, the well known chaim scission, cross-linking etc. reactions attributable to high energy radiation become more material. The range of 0.5–2.0 megarads is usable on the chlorinated hydrocarbon monomer polymer or copolymer plastic materials because such materials are not particularly sensitive to degradation. However, it is believed that the 0.5–2.0 range is nothing more than a usable range since side effects tend to balance out any additional gain in monomer clean up over what is achieved at 0.5 megarad. In total the reduction in monomer content is considered to be achieved almost entirely at the lower dose, with any further reduction in monomer content believed to be rather nominal.

A preferred mode of operation for those instances when treatment of the polymer material with more than 0.5 megarad is desired would be a repeat of the 0.05–0.5 megarad treatment.

Also preferred over a single treatment the 0.5–2.0 megarad range is 0.05–0.5 megarad irradiation of the polymer pellets or ground resin, followed by 0.05–0.5 megarad range treatment of the article formed from the pellets or ground resin.

Although the practice of this invention has been described generally as pertaining to treatment of high quality finished articles, one variation thereof herein contemplated is application of the concepts underlying this invention to the polymer pellets or ground resin prior to molding into the final article. The pellets or ground resin are subjected to 0.05–0.5 megarads for purposes of reducing the monomer content therein, and then they are processed according to the usual practices in the art. For high quality polymer, treatment of the pellets or powder may suffice to reduce monomer content to acceptable levels, particularly when the end use can tolerate presence of a nominal monomer content in the article. The double treatment i.e. first of pellets or powder and then of the formed article can be used on high quality polymer simply to be certain that everything possible has been done to minimize monomer content in the article.

The actual source of the high energy radiation is not material to the practice of this invention, and therefore any of the known to the art (commercially available) radiation sources are contemplated including for example radioactive sources of high energy gamma rays such as radioactive cobalt and electron beam generators such as the "Dynamitron" ®. Accordingly, further description of the high energy radiation source need not be provided, nor is there need to describe the details of the radiation treatment.

For further understanding of this invention reference is made to the following examples of practice thereof.

EXAMPLE I

Three different qualities of PVC sheets were irradiated with $^{60}Co$ gamma radiation at a dose-rate of 180 krads/h to 10 and 100 krads respectively. The irradiations were carried out at ambient temperature and in the presence of air or argon. The content of vinylchloride in the samples before and after the irradiations are given in the table below:

| Sheet nr | Initial content of vinyl chloride | 10 krads in air | 10 krads in argon | 100 krads in air | 100 krads in argon |
|---|---|---|---|---|---|
| 1 | 0.6 ppm | 0.4 ppm | 0.5 ppm | 0.0 ppm | 0.0 ppm |
| 2 | 0.5 ppm | 0.3 ppm | 0.3 ppm | 0.0 ppm | 0.0 ppm |

-continued

| Sheet nr | Initial content of vinyl chloride | 10 krads in air | 10 krads in argon | 100 krads in air | 100 krads in argon |
|---|---|---|---|---|---|
| 3 | 0.4 ppm | 0.3 ppm | 0.4 ppm | 0.0 ppm | 0.0 ppm |

This test shows that a 100 krads dosage reduced the vinyl chloride residue to beyond the capability of the analytic test procedure to measure monomer content; i.e. about 0.02 ppm.

What is claimed:

1. A method for reducing the residue content of halogen-substituted unsaturated hydrocarbon monomer in a homopolymer or copolymer plastic material derived from said monomer comprising irradiating said plastic material with ionizing radiation at a rad dosage level of from 0.050–2 megarads.

2. The method of claim 1 wherein the rad dosage is from 0.050–0.50 megarads.

3. The method of claim 1 or 2 wherein the monomer is vinyl chloride.

4. The method of claim 1 or 2 wherein the monomer is vinylidene chloride.

5. The method of claim 1 or 2 wherein the monomer is chloroprene.

6. The method of claim 1 wherein the rad dosage is from 0.1–0.5 megarads.

7. The method of claim 2 wherein the residue monomer content in the resulting plastic material is reduced substantially, no significant amount of chain scission has occurred, and no significant cross-linking, as measured by changes in rheologic properties, has occurred.

8. The method of claim 1 wherein the residue monomer content in said material prior to irradiation is a trace amount, and the only significant consequence of said irradiation is the significant reduction of said trace monomer content.

9. The method of claim 8 wherein the rad dosage is 10–100 Krads and the residue monomer content is reduced to below about 0.02 ppm.

10. The method of claim 9 wherein $60_{Co}$ gamma radiation is employed at a rate of 180 Krads/h and the initial residue monomer content was 0.4–0.6 ppm.

* * * * *